United States Patent [19]

Dorner

[11] Patent Number: 4,609,091
[45] Date of Patent: Sep. 2, 1986

[54] STORAGE UNIT FOR A CONVEYOR SYSTEM

[75] Inventor: Wolfgang C. Dorner, Oconomowoc, Wis.

[73] Assignee: Dorner Mfg. Corp., Hartland, Wis.

[21] Appl. No.: 669,625

[22] Filed: Nov. 8, 1984

Related U.S. Application Data

[63] Continuation-in-part of Ser. No. 406,368, Aug. 9, 1982, abandoned.

[51] Int. Cl.$^4$ ............................................. B65G 1/00
[52] U.S. Cl. ................................ 198/347; 198/433; 198/577; 414/331; 414/786
[58] Field of Search ............... 198/347, 427, 429, 485, 198/614, 435, 472, 648, 345, 460, 461, 577, 433, 465.1; 414/331, 536, 277, 278, 280, 285, 787, 786

[56] References Cited

U.S. PATENT DOCUMENTS

| | | | |
|---|---|---|---|
| 2,903,120 | 9/1959 | Thomas | 198/472 X |
| 2,953,234 | 9/1960 | Abendschein | 198/427 X |
| 3,360,100 | 12/1967 | Seragnoli | 198/347 |
| 3,470,996 | 10/1969 | Lee et al. | 198/347 |
| 3,499,555 | 3/1970 | Wahle | 198/347 |
| 3,876,057 | 4/1975 | Jones | 198/347 |
| 3,923,148 | 12/1975 | Dorner | 198/570 |
| 3,931,882 | 1/1976 | Ossbahr | 198/648 |
| 3,954,165 | 5/1976 | Snyder | 198/435 X |
| 4,141,458 | 2/1979 | Brooks et al. | 414/331 |
| 4,273,234 | 6/1981 | Bourgeois | 198/347 |
| 4,290,517 | 9/1981 | Hafferkamp | 198/427 |
| 4,396,338 | 8/1983 | Applegate et al. | 198/347 X |
| 4,487,309 | 12/1984 | Dorner | 198/491 |

FOREIGN PATENT DOCUMENTS

960177 12/1974 Canada ........................... 198/347

Primary Examiner—Joseph E. Valenza
Assistant Examiner—David A. Bucci
Attorney, Agent, or Firm—Andrus, Sceales, Starke & Sawall

[57] ABSTRACT

A storage unit for storing articles being conveyed on a conveyor system. The storage unit is located laterally adjacent a main conveyor, and includes a plurality of spaced parallel secondary conveyors that are disposed laterally of the main conveyor. The storage unit also includes a lifting assembly composed of a plurality of generally parallel supports which are adapted to pass within the spaces between the secondary conveyors as the lifting assembly is moved vertically. To operate the storage unit, a stop member is moved to an obstructing position with respect to the main conveyor to stop a row or train of articles, and the train of articles is then pushed laterally from the main conveyor by a pusher unit onto the secondary conveyors where the train is conveyed to the ends of the secondary conveyors. In this manner, successive rows or trains of articles are transferred from the main conveyor to the secondary conveyors until the secondary conveyors are filled. The lifting assembly is then elevated causing the supports to pass upwardly between the secondary conveyors and pick the articles from the secondary conveyors and elevate the articles to a storage location. The operation is repeated with successive levels of the storage unit being filled with articles. To return the articles to the main conveyor, the secondary conveyors are operated in the reverse direction and the supports are lowered to deposit a row of articles from the supports onto the secondary conveyors which in turn return the articles to the main conveyor. Locator guides mounted adjacent the main conveyor are elevated as the row of articles is returned to the main conveyor to engage the trailing ends of the articles in the row and urge the articles back onto the main conveyor.

20 Claims, 13 Drawing Figures

STORAGE UNIT FOR A CONVEYOR SYSTEM

This application is a continuation-in-part of application Ser. No. 06/406,368, filed Aug. 9, 1982, now abandoned.

BACKGROUND OF THE INVENTION

In a typical conveyor system, articles are automatically routed via a series of conveyors to various work stations where components can be assembled with the articles, or to inspection stations where the articles can be inspected or tested. Occasionally, the flow of articles in the conveyor system may be interrupted or slowed down because of a malfunction in the conveyor system, due to jamming of the articles, or due to a slowdown at a particular work or inspection station. In the event of a slowdown or stoppage, it is desirable to store or accumulate the articles upstream of the stoppage, so that it is not necessary to shut down the entire conveyor system. After the stoppage has been corrected, the articles can then be fed back into the conveying system.

In the past, various types of storage or accumulating units have been associated with conveyor systems to provide this function. However, in many cases, the storage units require substantial floor space, which may not be readily available in the plant, or the storage units are of a complicated and expensive construction which require frequent maintenance and repair.

SUMMARY OF THE INVENTION

The invention is directed to an improved storage or accumulating unit for a conveyor system, which is adapted to automatically store articles at a location upstream of a stoppage or slowdown in the conveyor system and to automatically return the articles to the conveyor system after the stoppage has been corrected. The storage unit is adapted for use in storing articles or workpieces of various shapes, and can also be used to store small pallets that support workpieces or component parts.

The invention can also be used for storing articles for the purpose of curing or aging parts.

In accordance with the invention, one or more storage units are located laterally adjacent the main conveyor, and the storage unit includes a tray assembly composed of a plurality of vertically spaced storage trays which are mounted for vertical movement with respect to the conveyor.

A plurality of generally parallel, spaced, secondary conveyors extend laterally from the main conveyor, and each tray in the tray assembly includes a plurality of generally parallel arms that are disposed to pass vertically within the spaces of the adjacent secondary conveyors as the tray assembly is moved vertically.

A stop member is associated with the main conveyor and when moved to an obstructing position will stop a row or train of articles on the main conveyor at a location adjacent the storage unit. A pusher unit is then operated to push the row of articles laterally from the main conveyor onto the secondary conveyors where the articles are transferred as a row to the rear of the tray assembly. Successive rows or trains of articles are similarly transferred from the main conveyor to the secondary conveyors until the secondary conveyors are filled with articles.

The tray assembly is then elevated causing the arms of the tray located immediately beneath the secondary conveyors to pass upwardly between the secondary conveyors and pick the articles from the conveyors and move the articles to a storage location.

Following the removal of the articles from the secondary conveyors, additional rows or trains of articles are transferred from the main conveyor to the secondary conveyors and when the secondary conveyors are again filled, the tray assembly is again elevated to bring the next lower tray upwardly to pick the articles from the secondary conveyors and move the articles upwardly for storage.

To return the articles to the main conveyor, the secondary conveyors are operated in the reverse direction, in a direction in which the conveying run moves toward the main conveyor, and on lowering of the tray assembly, the articles carried by the lowermost tray will be deposited on the secondary conveyors, which in turn, will convey the articles row-by-row back onto the main conveyor.

During a stoppage or slowdown in the conveyor system, the storage unit of the invention will act to automatically remove articles from the main conveyor and store the articles on a plurality of vertically movable trays. When the slowdown or stoppage has been corrected, the articles will be automatically returned to the conveyor line.

The storage unit enables a large number of articles to be stored in a relatively small floor space due to the fact that the storage is accomplished in a vertical mode. The tray assembly can include any desired number of vertically spaced trays and each tray, in turn, can include any desired number of projecting arms to thereby vary the capacity of the storage unit to meet the particular demands of the conveying system.

The articles are fed to the storage unit and returned to the main conveyor by positive mechanical action which will minimize lagging or jamming of the articles being stored.

The storage unit is particularly adapted for use in storing generally square pallets which are adapted to contain small components. As the storage unit maintains the pallets in a horizontal attitude at all times, there is no possibility of the components being displaced during the storage operation.

Other objects and advantages will appear in the course of the following description.

DESCRIPTION OF THE DRAWINGS

The drawings illustrate the best mode presently contemplated of carrying out the invention.

In the drawings.

DESCRIPTION OF THE PREFERRED EMBODIMENT

FIGS. 1-5 illustrate a conveyor 1 as used in a conveying system which is adapted to convey a plurality of articles 2. The articles 2 as shown in FIGS. 1-5, are in the form of generally square pallets having recesses or locating members, not shown, in their upper surfaces to contain a product or component of manufacture.

In accordance with the invention, one or more storage units 3 are mounted alongside the conveyor 1 and serve to accumulate or store articles 2 in the event there is a slowdown or stoppage in the conveyor system downstream of the storage unit.

Figure 1:
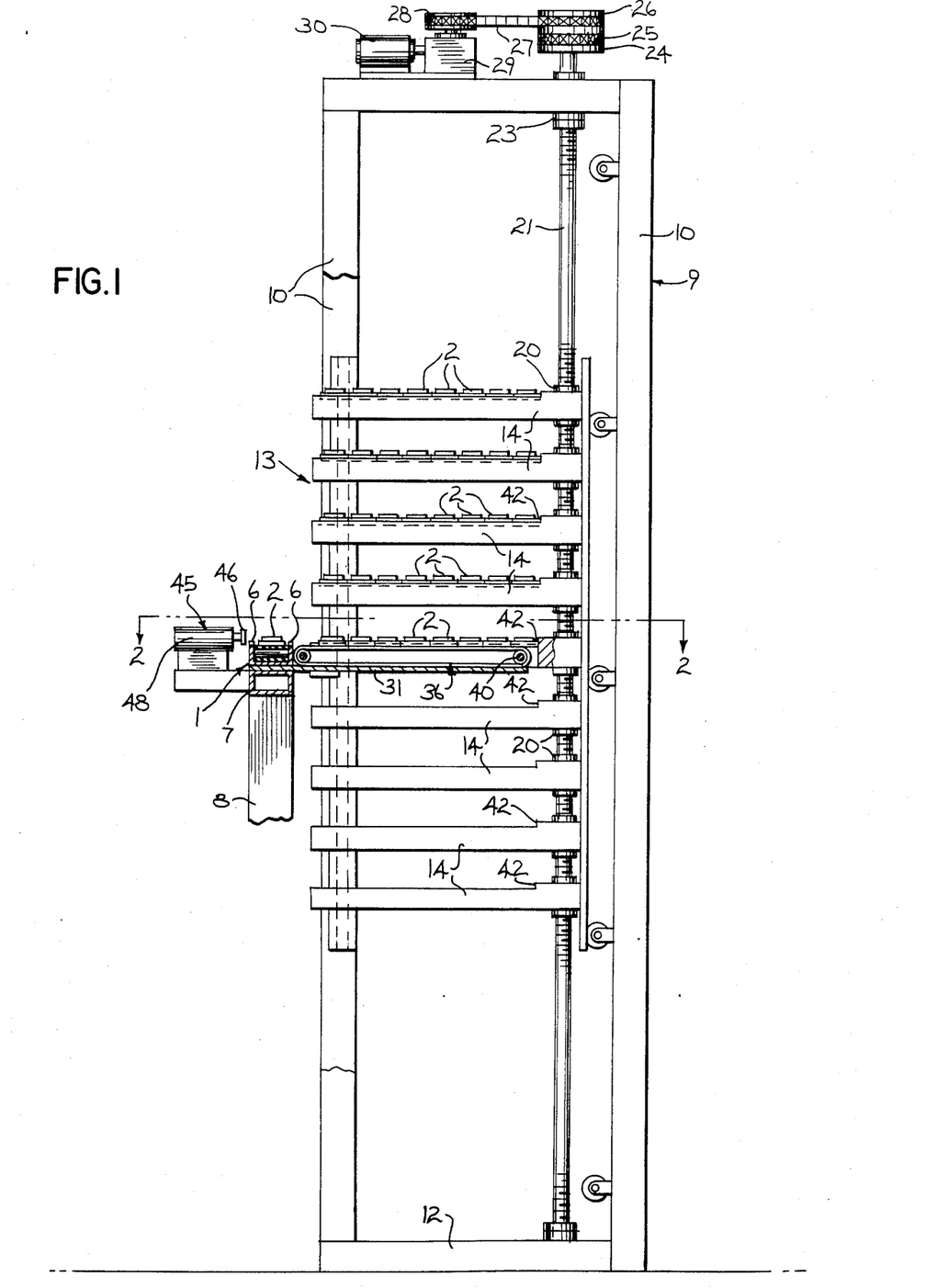
FIG. 1 is a side elevation of the storage unit of the invention as associated with a conveyor with parts broken way in section.

The conveyor 1 can be constructed as disclosed in U.S. Pat. No. 3,923,148 and consists of a generally U-shaped frame 4 and an endless conveyor belt 5 is mounted for travel on frame 4. Suitable drive rollers are journalled between the side walls 6 of frame 4 and serve to drive the belt in a path of travel, as shown by the arrow in FIG. 2. As illustrated in FIG. 1, the side walls 6 project upwardly beyond the level of the conveying run of belt 5 and serve to retain the articles 2 on the belt.

As shown in FIG. 1, conveyor 1 is supported on a horizontal beam or support 7 which, in turn is supported from the ground or foundation by a series of vertical supports 8.

Storage unit 3 includes a frame or supporting structure 9 composed of a series of vertical columns or supports 10 which are connected at their upper ends by horizontal members 11 and connected at their lower end by horizontal members 12. In plan view, the frame 9 has a generally U-shaped configuration, as illustrated in FIG. 2.

Mounted for vertical movement within the frame 9 is a tray assembly 13 composed of a plurality of vertically spaced, article supporting, trays 14. FIG. 1 illustrates nine trays 14 in the assembly, but it is contemplated that any desired number of trays can be utilized depending on the capacity of the storage unit.

Figure 2:
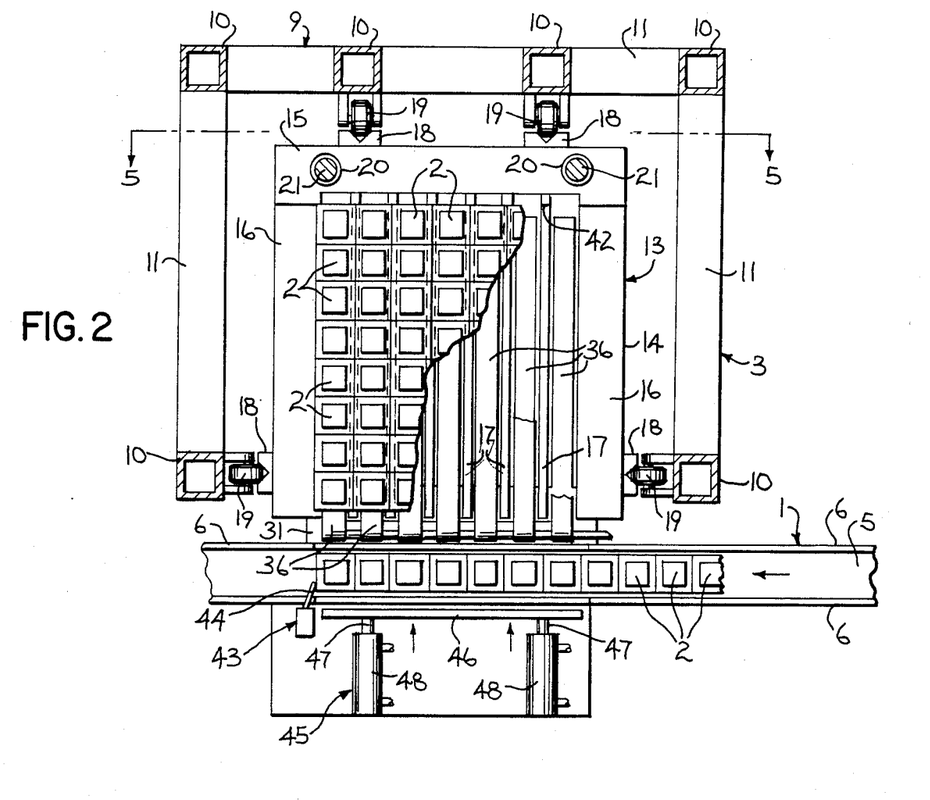
FIG. 2 is a horizontal section taken along line 2—2 of FIG. 1.

As shown in FIG. 2, each tray 14 is composed of a rear member 15 which extends generally parallel to the conveyor 1 and a pair of side members 16 which extend outwardly from the ends of the rear member and terminate adjacent the sides of the conveyor 1. In addition, each tray includes a plurality of generally parallel arms or rails 17 which project toward the conveyor 1, as illustrated in FIG. 2.

To guide tray assembly 13 in vertical movement, guide rails 18 connect the trays 14 and roller units 19 mounted on frame 9 are adapted to ride in the V-shaped rails 18, as tray assembly 13 is moved vertically.

Figure 5:
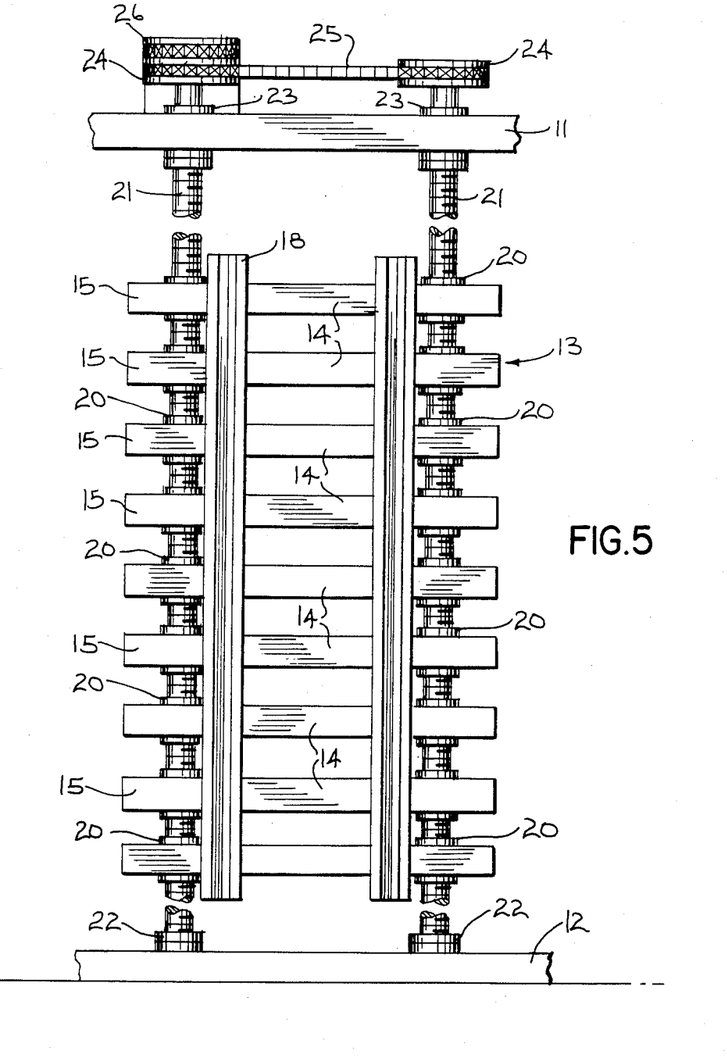
FIG. 5 is a section taken along line 5—5 of FIG. 2.

To drive the tray assembly 13 in vertical movement, nuts 20 are mounted on the rear member 15 of each tray 14 and lead screws 21 are threadedly engaged with nuts 20. The lower ends of screws 21 are journalled within bearings 22 mounted on frame members 12, while the upper end of the lead screws are journalled within bearings 23 supported by the upper horizontal members 11. As shown in FIG. 5, the upper ends of screws 21 carry sprockets 24 which are interconnected by chain 25. In addition, one of the lead screws 21 carries a second sprocket 26 which is connected by chain drive 27 to a sprocket 28 mounted on the output shaft of gear box 29, which is driven by motor 30. With this construction, operation of motor 30 will act to rotate lead screws 21 in unison and in the same direction to raise and lower the tray assembly 13 with respect to frame 9.

As best illustrated in FIG. 1, horizontal support plate 31 is mounted on the horizontal beam 7 and extends laterally from conveyor 1 and a plurality of spaced parallel fingers 32 are attached to, or formed integrally with, plate 31. Plate 31 is fixed and the arms 17 of trays 14 are adapted to move vertically within the spaces 33 between adjacent fingers 32.

To guide arms 17 in movement, pads 34 are located at the base of each finger 32 and pads 34 are provided with rounded edges 35. As the tray assembly 13 is moved vertically, the outer extremity of the arms will be guided in vertical movement to retain the arms in parallel relationship by the guide pads 34.

Figure 3:
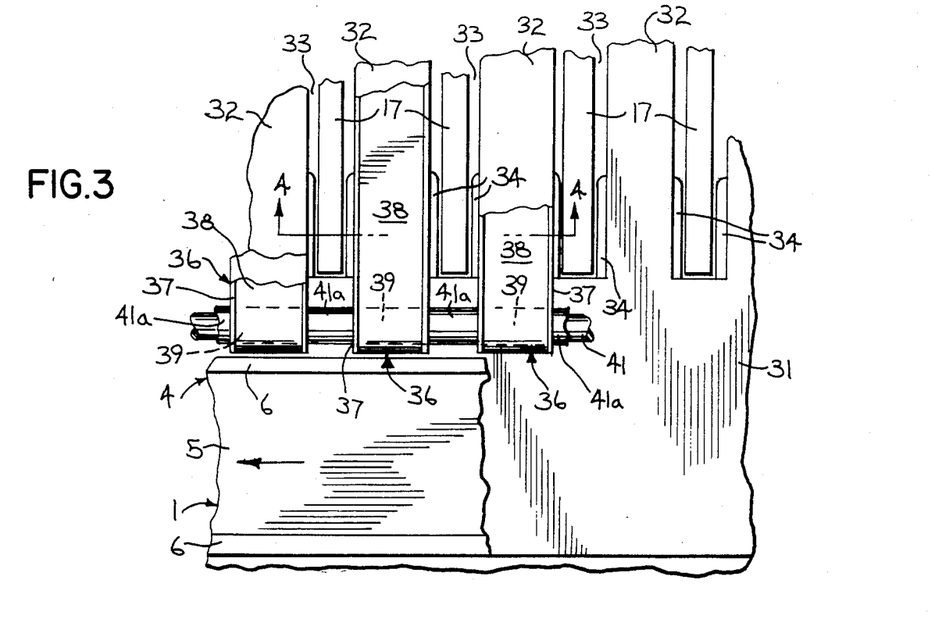
FIG. 3 is an enlarged fragmentary horizontal section showing the main conveyor and secondary conveyors.

Storage unit 3 also includes a plurality of reversible secondary conveyors 36 which extend laterally from main conveyor 1 and act to convey articles from the main conveyor onto the storage trays 14. Each conveyor 36 is composed of a generally U-shaped frame 37 and a conveyor belt 38 is carried by a drive roller 39 and an idler roller 40. Rollers 39 and 40 are journaled within the side walls of the U-shaped frame 37, and drive conveyors 36 in synchronization. A common drive shaft 41 is interconnected to the drive rollers 39, as shown in FIG. 3. If the articles 2 have a hollow or recessed bottom surface, cylindrical spacers 41a can be attached to shaft 41 between conveyors 36. Shaft 41 is driven in a conventional manner by a reversible motor, not shown.

Each arm 17, as well as the side members 15 are provided with upwardly extending shoulders 42, as best shown in FIG. 1, to serve as stops to position the articles 2 as they are being conveyed laterally by the secondary conveyors 36.

As shown in FIG. 3, the end of each secondary conveyor 36 is disposed adjacent a side edge of the main conveyor 1 and the belts 38 of the secondary conveyors 36 are raised slightly above the belt 5 of the main conveyor. One side wall 6 of the main conveyor is dropped at a location adjacent the storage unit 3 so that articles on the belt 5 can be moved laterally onto the secondary conveyors 36.

Located at the downstream end of storage unit 3 is a finger stop assembly 43 which can be constructed in a manner similar to that shown in pending U.S. patent application Ser. No. 06/337,590, filed Jan. 1, 1982, now U.S. Pat. No. 4,487,309. In general, finger stop assembly 43 includes a stop member 44 that can be moved between a non-obstructing position with respect to conveyor 1 and an obstructing position. When stop member 44 is in the obstructing position, it will stop the articles 2 being moved along conveyor 1 and the articles will then accumulate on conveyor 1 in the form of a row or train. The row of articles 2 on conveyor 1 is pushed from the conveyor onto the secondary conveyors 36 by a pusher assembly 45. Pusher assembly 45 includes a pusher plate 46 which extends longitudinally of conveyor 1 and the pusher plate 46 is supported by one or more piston rods 47 which are slidable within cylinders 48. As shown in FIG. 1, the cylinders 48 are suitably supported from the beam 7. By operation of the cylinders 48, pusher plate 46 will be moved laterally across the conveyor 1 to push the train of articles from conveyor 1 onto the secondary conveyors 36.

Figure 4:
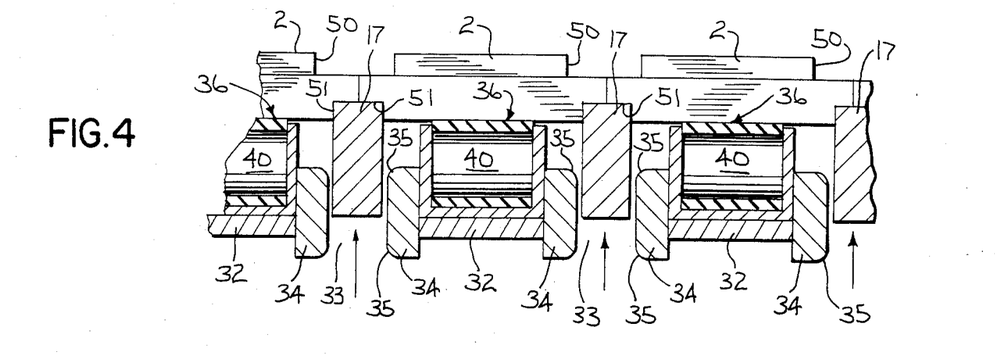
FIG. 4 is a section taken along line 4—4 of FIG. 3.

As previously mentioned, the storage unit can be used to store articles of any configuration, and is particularly adaptable for storing generally rectangular articles or pallets 2 which, as shown in FIG. 4, can include an upper shoulder 50 and a lower recess 51, both of which extend completely around the periphery of the pallet. In addition, the upper surface of each pallet may include recesses or pockets, not shown, for holding the part to be manufactured or components thereof.

During normal operation of the conveyor system, tray assembly 13 is in its lowermost position in which all of the trays 14 are located beneath the level of the conveying runs of the conveyors 36. When a slowdown or stoppage occurs downstream in the conveyor system and it is desired to store or accumulate the articles 2, the stop 43 is actuated moving stop member 44 to an obstructing position to thereby stop a row or train of articles on conveyor 1. Pusher assembly 45 is then actuated pushing the train of articles from conveyor 1 onto the conveyors 36 which move the row of articles laterally toward the rear member 15. Spacers 41a aid in supporting the pallets 2 as they are moved from conveyor 1 to conveyors 36 and prevent tilting of the pallets, which can occur if the pallets have a hollow bottom.

The articles 2 being conveyed on conveyors 36 will engage the stops 42 to thereby limit the lateral movement of the first row of articles.

After a second row or train of articles has accumulated on conveyor 1, the pusher unit 45 is again actuated to push this row of articles onto conveyors 36 where they, in turn, are conveyed laterally until they engage the first row of articles. This process is repeated until the conveyors 36 are filled with rows of articles 2. At this time, the tray assembly 13 is elevated thereby causing the arms 17 of the uppermost tray 15 to pass between adjacent conveyors 36 to pick up the articles 2 from the conveyors 36. As shown in FIG. 4, the upper edges of arms 17 engage the recesses 51 in the lower surfaces of the articles 2 to thereby prevent lateral shifting of the articles as they are lifted from conveyors 36 by arms 17. The tray assembly 13 is elevated until the next succeeding tray 14 is at the level just beneath the conveying run of conveyors 36. In some instances, recesses 51 are not utilized, in which case the arms 17 engage the lower surfaces of the adjacent pallets 2.

The process is repeated with successive rows or trains of articles 2 being transferred onto the then empty conveyors 36. When the conveyors are again filled, the tray assembly 13 is again elevated causing the next succeeding tray 14 to pick the articles 2 from the conveyors 36 and elevate the articles. The procedure can be repeated until all of the trays 14 are filled with articles.

When it is desired to return the articles to the conveyor 1, the direction of travel of conveyors 36 is reversed so that the conveying run of belts 38 will be in a direction toward conveyor 1. The tray assembly 13 is then lowered and the articles 2 on the lowermost tray 14 will be deposited on conveyors 36 and movement of conveyors 36 will cause the outermost row or train of articles to be transferred laterally to the conveyor 1. As the belts 38 of conveyors 36 are at a slightly elevated level with respect to the belt 5 of conveyor 1, the articles will be transferred to the conveyor 1 with minimum tilting or skewing.

After the first row of articles has been returned to the conveyor 1, the conveyors 36 are momentarily reversed to take the pressure off of the row of articles on conveyor 1. When the first row of articles has been moved away by conveyor 1, the direction of travel of conveyors 36 is again reversed to move the next row of articles onto the conveyor 1. This procedure is repeated until all of the rows of articles have been transferred back to the conveyor 1.

When the conveyors 36 have been emptied, the tray assembly 13 is again lowered causing the articles on the next succeeding tray 14 to be deposited onto the conveyors 36. The process is repeated in returning the articles from conveyors 36 to conveyor 1.

The invention provides a storage unit which will automatically remove articles from the conveyor during periods of slowdown or stoppage and automatically return the articles onto the conveyor after the stoppage has been remedied.

The capacity of the storage unit can be readily varied by changing the number of trays 14 and/or by changing the number of arms 17 in each tray. As the storage unit operates in a vertical fashion, a large capacity is achieved with minimum floor space. The vertical distance between arms 17 need only be about $\frac{1}{2}''$ greater than the combined height of the articles 2 and any parts contained therein.

While the drawings have shown a lead screw drive to raise and lower the tray assembly 13, it is contemplated that other drive systems, such as, for example, a chain drive, can be used for that purpose. Similarly, other drive mechanisms, such as a rack and pinion drive, can be substituted for the fluid cylinders 48 in moving push bar 46.

FIGS. 6–13 illustrate a modified form of the storage unit of the invention. In this embodiment, the storage unit 52 includes a generally U-shaped frame, not shown, similar in construction to frame 9 of the first embodiment. A U-shaped tray assembly, indicated generally by 53, is mounted for vertical movement within the frame, and the tray assembly is composed of a rear member similar to member 15, previously described, and a pair of side members that extend forwardly from the rear member and are similar in construction to side members 16 of the first embodiment. Tray assembly 53 also includes a series of spaced, parallel, vertical plates 54.

Tray assembly 53 can be moved vertically, within the frame of the storage unit, by a lead screw drive, similar to lead screws 21, previously described. Alternately, tray assembly 53 can be raised and lowered through use of a mechanical chain drive or a hydraulic drive mechanism.

Figure 6:
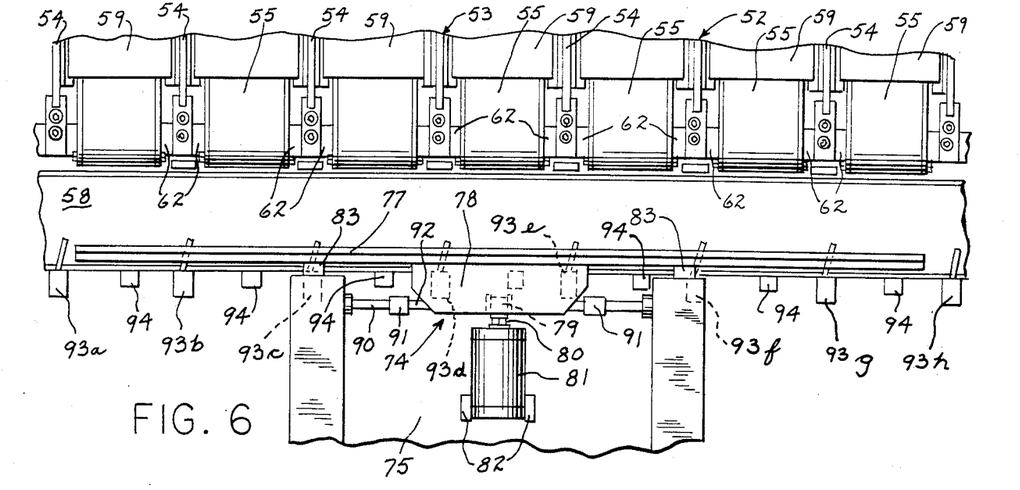
FIG. 6 is a plan view of a modified form of the storage unit of the invention.
Figure 9:
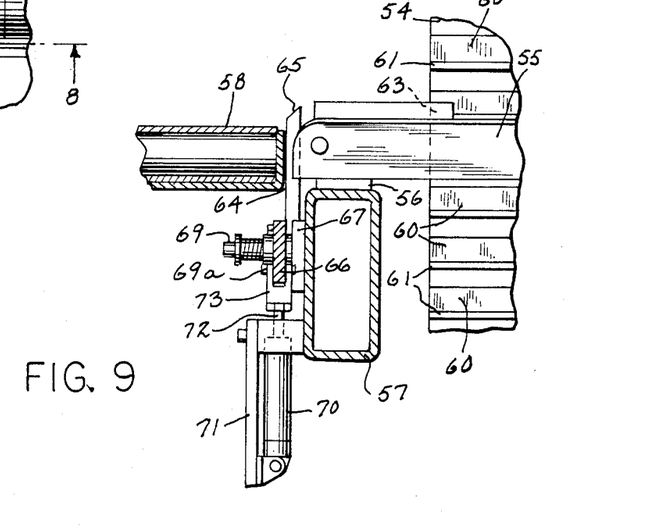
FIG. 9 is a section taken along line 9—9 of FIG. 7.

As best illustrated in FIG. 6, a plurality of reversible secondary conveyors 55, similar in construction to conveyors 36, are mounted on the frame of the storage unit and are located between adjacent plates 54 of tray assembly 53. As shown in FIG. 9, the forward end of each secondary conveyor 55, is secured to a mounting plate 56 and mounting plates, in turn, are secured to a horizontal box-shaped beam 57. Conveyors 55 are driven in synchronization by a drive system as described with respect to the first embodiment.

Figure 7:
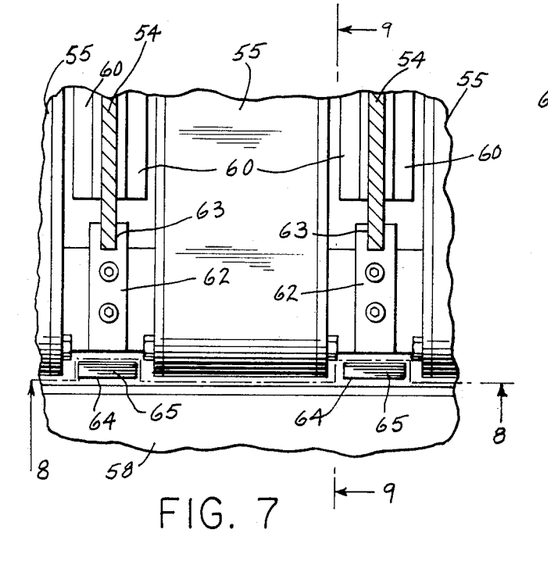
FIG. 7 is a fragmentary enlarged portion of the plan view shown in FIG. 6.

As shown in FIG. 7, the forward ends of the secondary conveyors 55 are located in proximate relation to the side edge of main conveyor 58 which is similar in construction to conveyor 1, previously described.

To elevate pallets 59 or other articles to be stored from the secondary conveyors 55, a plurality of L- shaped brackets 60 are mounted in spaced relation on either side of each of the vertical plates 54, and the horizontal legs of brackets 60 define ledges or shoulders which support the pallets, or other articles 59 to be stored.

Figure 8:
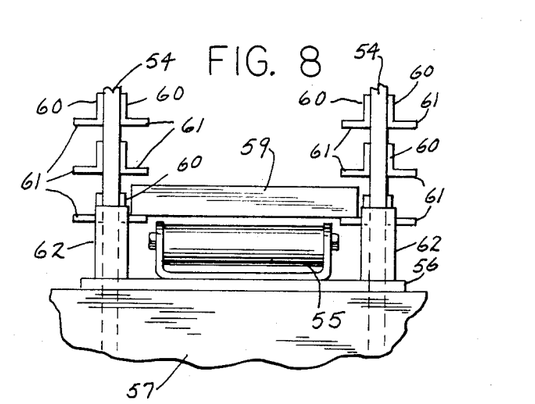
FIG. 8 is a section taken along line 8—8 of FIG. 7.

As illustrated in FIG. 8, pallets 59 have a width greater than the width of the secondary conveyors 55, so that the side edges of the pallets project outwardly from the sides of the conveyor. Vertical movement of the plates 54 will cause the ledges 61 of brackets 60 to engage the projecting edges of pallets 59 on conveyor 55 to elevate the pallets from the conveyor to a storage location. Conversely, downward movement of vertical plates 54 of tray assembly 53 will cause pallets 59 supported on the ledges 61 be deposited on the belts of the secondary conveyors 55.

To guide plates 54 in vertical movement, a pair of guide brackets 62 are mounted on each mounting plate 56 on either side of the respective secondary conveyor 55. As shown in FIG. 7, the rear end of each guide bracket 62 is provided with a vertical groove 63 which receives the forward edge of the respective plate 54.

When it is desired to return pallets 59 from the secondary conveyors 55 back to the main conveyor 58, conveyors 55 are operated in a direction toward the main conveyor 58 and the first row of pallets 59 is moved onto the main conveyor. To aid in redelivering the pallets 59 back onto the main conveyor 58 and preventing skewing of the pallets on the main conveyor, locator guides 64 are mounted between each guide bracket 62 and the side of the main conveyor 58. Locator guides 64 are mounted for vertical movement and the upper end of each locator guide is formed with an inclined surface 65 which is adapted to engage the trailing edge of a pallet 59 as the locator guide is elevated to urge or wedge the pallet onto the main conveyor. The action of the locator guides 64 insures that the pallets will be properly returned to main conveyor 58 and prevents skewing of the pallets as they are moved forwardly on the main conveyor.

Locator guides 64 perform a second function during normal operation of the main conveyor and when the storage unit 52 is not being utilized. Locator guides 64, being positioned along the side edge of the main conveyor, aid in keeping the pallets 59 aligned on the main conveyor and prevent skewing of the pallets due to vibration or skewing when the pallets are stopped on the main conveyor by engagement of one corner of the pallet with a stop member.

Figures 10, 12, 13:
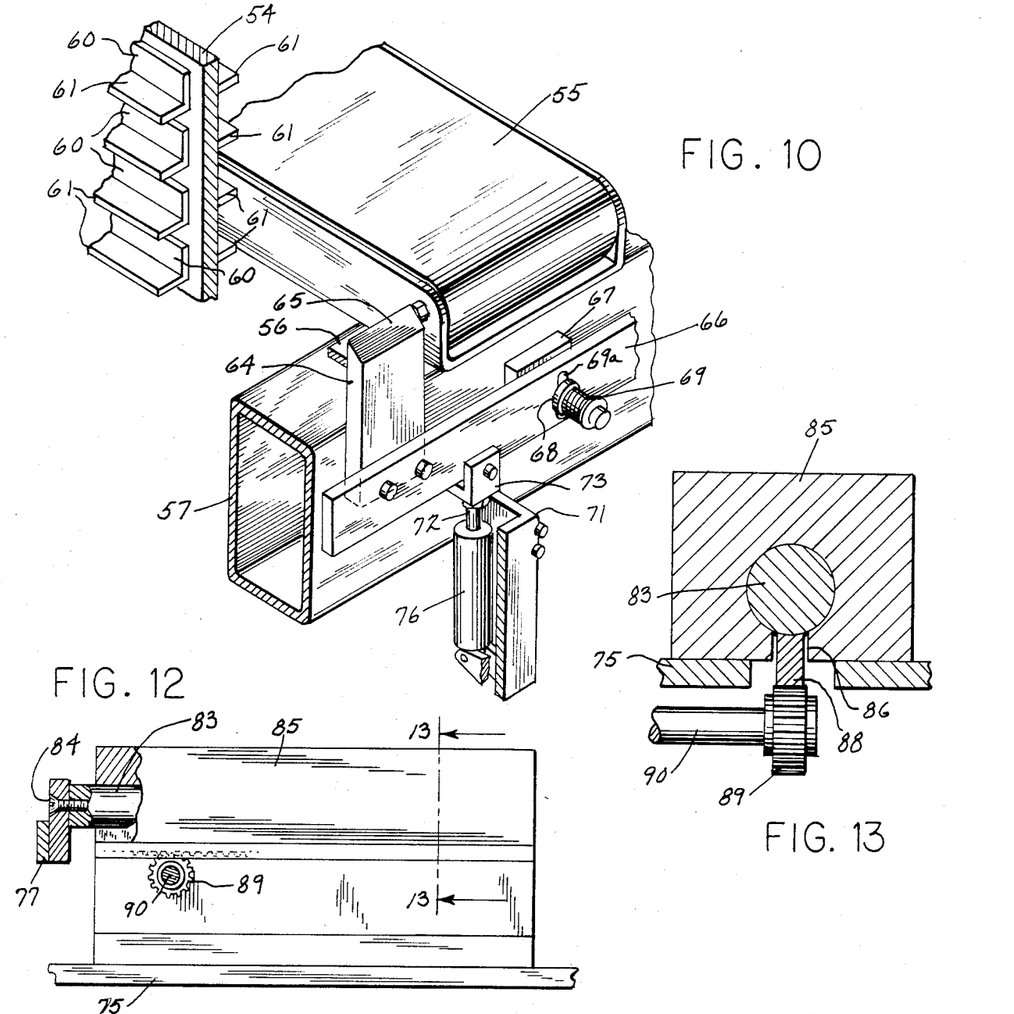
FIG. 10 is a perspective view of the mechanism for actuating the locator guides.
FIG. 12 is a side elevation with parts broken away in section showing the guide mechanism for the pusher bar.
FIG. 13 is a section taken along line 13—13 of FIG. 12.

FIG. 10 illustrates the mechanism for raising and lowering the locator guides 64. All of the locator guides 64 associated with storage unit 52 are secured to a common plate 66, and plate 66 is mounted for vertical movement between a plurality of spacers 67, which are secured at intervals to beam 57, and washers 68 which engages the outer surface of plate 66. Spring loaded shoulder bolt 69 urges washer 68 against the plate 66. To accommodate vertical movement of plate 66, the plate is provided with elongated slots 69a through which the bolts 69 extend.

Plate 66 and locator guides 64 are moved vertically by a series of fluid cylinders 70 which are mounted through brackets 71 to beam 57. Cylinders 70 are spaced along the length of plate 66, and the piston rod 72 of each cylinder 70 carries a clevis 73 which is connected to the lower edge of plate 66. Through operation of cylinders 70, plate 66 and locator guides 64 can be raised and lowered.

The embodiment shown in FIGS. 6–12 also includes a pusher assembly 74 which acts to push a row or train of the pallets 59 that are stopped on the main conveyor 58 onto the secondary conveyors 55. The pusher assembly 74 is carried by a horizontal plate 75 that extends outwardly from the frame that carries the main conveyor 58.

Figure 11:
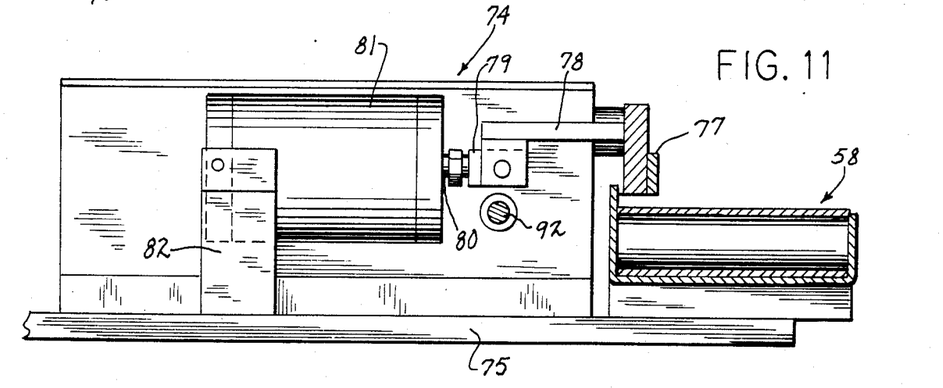
FIG. 11 is a side elevation of the mechanism for operating the pusher bar.

Pusher assembly 74 includes an elongated pusher bar 77, which in its inoperative or storage position, is located along the side edge of main conveyor 58. Connected to the outer surface of pusher bar 77 is a horizontal plate 78, and the outer end of plate 78 is connected through clevis 79 to the outer end of piston rod 80 of fluid cylinder 81. Cylinder 81 is mounted through lugs 82 to plate 75. Operation of the cylinder will cause the piston rod 80 to extend to move the pusher bar 77 laterally across main conveyor 58 to pushed a row of pallets 59 onto the secondary conveyors 55.

As the pusher bar 77 has considerable length, a guide mechanism is included which will prevent skewing of the pusher bar and provide a uniform transfer of the pallets 59 onto the secondary conveyors 55. The guide mechanism includes a pair of guide rods 83 which are connected to pusher bar 77 by screws 84. Each guide rod 83 is slidable within a bearing block 85 that is mounted on plate 75. As best illustrated in FIGS. 12 and 13, the lower surface of bearing block 85 is provided with a slot 86 and a rack 88 on rod 83 extends downwardly through slot 86. Rack 88 is engaged with a pinion 89 mounted on shaft 90 that extends parallel to the conveyor 58. Each pinion shaft 90 is connected through a coupling 91 to shaft 92 that extends beneath the plate 78.

With this construction, movement of the pusher bar 77 by actuation of cylinder 81 will cause guide rods 83 and racks 88 to correspondingly move, thereby rotating pinions 89. As the pinions are tied together through shaft 92, both ends of the pusher bar 77 will be moved in synchronization, thereby prevent skewing of the pusher bar and insuring that the pallets 59, or other articles being stored, are uniformly pushed from conveyor 58 onto the secondary conveyors 55.

The construction shown in FIGS. 6–12 has the advantage of increasing the storage capacity for a given vertical height. In the construction shown in FIGS. 1–5, the arms are cantilevered from the rear end of the movable tray assembly and, as such, the arms had considerable depth to provide the required stiffness or rigidity. In the construction shown in FIGS. 6–13, plates 54 extend throughout the entire height of the tray assembly 53 so that the ledges 61 can be spaced apart a distance slightly greater than the height of the pallets 59 or articles being stored.

In operation, the pallets 59 are moved along the main belt conveyor 58 and when a slowdown or stoppage occurs downstream, the pallets or articles 59 can be stored in the storage unit 52.

To effect the storage procedure, a plurality of movable stops 93a–h are mounted along the side of main conveyor 58 and are programmed to stop a train or row of pallets or articles 59 so that the row can be transferred onto the secondary conveyors 55. In the embodiment of FIGS. 1–5, the articles in the stopped train are in end-to-end abutting relation and are transferred in this abutting relation onto the secondary conveyors. However, in the embodiment of FIGS. 6–13, the pallets 59 on one secondary conveyor 55 are not in abutting relation with pallets on an adjacent secondary conveyor, as shown in FIG. 1, because of the presence of the vertical plates 54 and vertical flanges of supports 60. Therefore, the pallets 59 are stopped in spaced relation, rather than in abutting relation, on the main conveyor 58 and are transferred in spaced relation onto the secondary conveyors 55.

To provide the spaced relationship of the stopped pallets, sensors 94 are mounted along the side edge of main conveyor 58 between each adjacent pair of stops 93 and are designed to sense the presence of a pallet at the position of the sensor. Both the stops 93 and sensors 94 are located above the level of the conveyor 58 but beneath the lower edge of pusher bar 77.

When it is desired to stop a row or train of pallets 59 on conveyor 58, stop 93a is moved from a non-obstructing positon to an obstructing position where it will stop a pallet moving on the conveyor 58. The stopped pallet will then actuate the sensor 94 located immediately upstream of stop 93a which, in turn, will operate through the desired electronic circuitry to move the next stop 93b to an obstructing position to stop a second pallet in spaced relation to the first stopped pallet. The second stopped pallet will then actuate the sensor 94 located immediately upstream of stop 93b which operates to move the next stop 94c to the obstructing position. This procedure is repeated until the entire row of pallets 59 is stopped in spaced relation. When the last sensor 94 upstream of stop 93h is actuated by the presence of a stopped pallet, the sensor generates a signal to operate cylinder 81 causing pusher bar 77 to transfer the row of pallets to the secondary conveyors 55.

Operation of the conveyors 55 will then move the pallets rearwardly on the conveyors 55 until the pallets engage stops at the ends of the secondary conveyors, as previously described in connection with the first embodiment.

In the same manner, additional rows or trains of pallets are fed to the secondary conveyors 55 and when the secondary conveyors are full, the tray assembly 53 is elevated causing the plates 54 to move upwardly and the ledges 61 will engage the side edges of the pallets to elevate the pallets above the secondary conveyors. With the pallets 59 elevated from the secondary conveyors 55, the procedure can be repeated with additional pallets being moved onto the secondary conveyors and subsequently elevated for storage.

When it is desired to return the pallets to the main conveyor 58, the tray assembly 53 is lowered causing the lowermost tier of pallets 59 to be returned to the secondary conveyors 55. The secondary conveyors 55 are then operated in a reverse direction resulting in the outermost pallet on each secondary conveyor being transferred back to the main conveyor 58. As the first row of pallets are returned to the main conveyor 58, the direction of operation of the secondary conveyors 55 is momentarily reversed, causing the secondary conveyors to move in a direction away from the main conveyor to separate the pallet being moved onto the main conveyor from the next adjacent pallet. During this period of separation the locator guides 64 are elevated by operation of cylinders 70, causing the inclined surfaces 65 of guides 64 to engage the trailing edges of the pallets to firmly push the pallets against the pusher bar 77, which is then in its inoperative or storage position. The row of pallets returned to the main conveyor 58 is then conveyed away on the main conveyor, the locator guides 64 are lowered and the secondary conveyors 55 are then reversed in travel to move a second row of pallets back onto the main conveyor in the manner described.

Various modes of carrying out the invention are contemplated as being within the scope of the following claims particularly pointing out and distinctly claiming the subject matter which is regarded as the invention.

I claim:

1. A conveying system having a storage unit for storing articles, comprising a main conveyor to convey a plurality of articles, a support structure disposed laterally of main conveyor and including a plurality of spaced parallel support members, a plurality of spaced parallel secondary conveyors, each secondary conveyor supported on one of said support members, said secondary conveyors extending laterally of the main conveyor with one end of each secondary conveyor being disposed adjacent a side of the main conveyor, a storage assembly disposed adjacent said main conveyor and having a plurality of generally parallel lifting members disposed to move within spaces between adjacent secondary conveyors, first drive means for moving said lifting members vertically relative to said main conveyor, transfer means for transferring a row of articles disposed in end-to-end relation on said main conveyor laterally onto the respective secondary conveyors, second drive means for operating said secondary conveyors in unison to move said row of articles laterally of said first conveyor, and stop means positioned at the end of each secondary conveyor to stop movement of said row of articles on said secondary conveyors, said articles having a greater dimension than the width of said secondary conveyors, whereby opposed ends of said articles project beyond the sides of the respective secondary conveyors, upward vertical movement of said lifting members within said spaces engaging said projecting ends of the articles to lift the articles upwardly from said secondary conveyors to a storage location, said lifting members being constructed and arranged to prevent lateral movement between each of the articles in said row as the articles are moved upwardly.

2. The system of claim 1, wherein each secondary conveyor includes a drive roller to drive said belt, and said system includes a common shaft interconnecting said drive rollers to thereby drive said secondary conveyors in synchronization.

3. The system of claim 1, and including a movable abutment associated with the main conveyor and located downstream of said storage unit, said abutment being movable between a non-obstructing and an obstructing positon, said abutment when in the obstructing position stopping movement of articles on said main conveyor to thereby accumulate said articles in the form of said row.

4. The system of claim 1, wherein said transfer means comprises an elongated pusher plate disposed generally parallel to said main conveyor, and operating means for moving the pusher plate laterally with respect to said main conveyor to push the row of articles onto said secondary conveyors.

5. The system of claim 1, and including guide means disposed on said support members to guide said lifting members in vertical movement relative to said secondary conveyors.

6. The conveying system of claim 1, wherein the articles to be conveyed comprise generally rectangular pallets, each pallet supporting a workpiece.

7. The system of claim 1, wherein said parallel lifting members comprise a plurality of parallel vertical plates, said plates having a plurality of vertically spaced laterally extending abutments on opposite surfaces disposed to support the projecting ends of said articles.

8. The system of claim 7, and including guide means mounted on said support structure for guiding said plates in vertical movement.

9. The system of claim 5, wherein said guide means comprises a plurality of guide blocks, each guide block having a vertically extending notch to receive a vertical edge on one of said lift members.

10. The system of claim 4, wherein said system includes guide means connected to spaced locations on said pusher plate for guiding said pusher plate in lateral movement, and interconnecting means interconnecting said guide means to insure synchronous movement of said guide means and prevent skewing of said pusher plate.

11. A conveying system having a storage unit for storing articles, comprising a main conveyor to convey a plurality of articles, a support structure disposed laterally of said main conveyor, a plurality of spaced parallel secondary conveyors extending laterally of the main conveyor with one end of each secondary conveyor being disposed adjacent a side of said main conveyor, a storage assembly disposed adjacent said main conveyor and having a plurality of generally parallel lifting members disposed to move vertically within the spaces between adjacent secondary conveyors, first drive means for moving said lifting members vertically relative to said secondary conveyors, transfer means for transferring a row of articles disposed in end-to-end relation on said main conveyor laterally onto the respective secondary conveyors, reversible second drive means for operating said secondary conveyors in unison to move said row of articles laterally of said first conveyor, stop means positioned at the end of each secondary conveyor to stop movement of said row of articles on said secondary conveyors, said articles having a greater dimension than the width of said secondary conveyors whereby opposed ends of said articles project beyond the sides of the respective secondary conveyors, upward vertical movement of said members within said spaces engaging the projecting ends of the articles to lift the articles upwardly from said secondary conveyors to a storage location, downward vertical movement of said members within said spaces acting to return said articles from said storage location to said secondary conveyors, reverse movement of said second drive means acting to sequentially return each row to said main conveyor, and positioning means located adjacent said side of the main conveyor and disposed to move and engage the trailing ends of the articles in said row, as said row is returned to said main conveyor to urge said articles onto said main conveyor.

12. The system of claim 11, wherein said positioning means is movable from a first position disposed beneath the level of said secondary conveyors to a second operative position located above the level of said secondary conveyors.

13. The system of claim 12, wherein said positioning means includes a pair of positioning members disposed along the sides of each secondary conveyor, each positioning member having an upper inclined end that is tapered upwardly and laterally in a direction away from said main conveyor.

14. The system of claim 11, wherein said parallel lifting members are vertical plates, said plates having a plurality of vertically spaced laterally extending abutments on opposite surfaces positioned to engage the projecting ends of said articles.

15. The system of claim 14, and including stop means operably associated with said main conveyor for stopping said row of articles on said main conveyor in spaced end-to-end relation.

16. The system of claim 15, wherein said stop means includes a plurality of stop members each movable from a non-obstructing position to an obstructing position above said main conveyor and in the path of movement of said articles on said main conveyor, each stop member being positioned in general alignment with a side edge of a corresponding secondary conveyor so that an article stopped by each stop member will be aligned with the respective secondary conveyor, and article sensing means positioned between adjacent pairs of stop members for sensing the presence of an article stopped by the downstream stop member of said pair, each article sensing means being operable to move the upstream stop member of said pair from the non-obstructing position to the obstructing position to thereby cause said upstream stop member to stop an article.

17. A method of conveying articles, comprising the steps of conveying a plurality of articles on a main conveyor, stopping a train of articles in end-to-end relation on said main conveyor, transferring said train of articles laterally in unison to a plurality of spaced parallel secondary conveyors disposed laterally of said main conveyor and overhanging opposed ends of each article beyond the corresponding sides of the respective secondary conveyors, operating said secondary conveyors in a first direction to move said train in said first direction, engaging said train with stop means to position the train at a given location spaced laterally from said main conveyor while continuing operation of said secondary conveyors, stopping a second train of articles on said main conveyor, transferring said second train laterally to said secondary conveyors while operating said secondary conveyors to thereby move said second train laterally on said secondary conveyors into engagement with said first train, moving a plurality of parallel members upwardly within the spaces between adjacent secondary conveyors to simultaneously lift said trains from said secondary conveyors and elevate said trains to a storage location, lowering said members to a level beneath said secondary conveyors to redeposit said trains on said secondary conveyors, operating said secondary conveyors in a second direction toward said main conveyor to sequentially return each train to said main conveyor, momentarily operating said secondary conveyors in said first direction after said first train has been returned to said main conveyor to release engagement between said first and second trains, operating said main conveyor to convey each train as it is received on said main conveyor to a desired location, and thereafter operating said secondary conveyors in said second direction after said first train has been conveyed away on said main conveyor to return said second train to said main conveyor.

18. The method of claim 17, and including the step of pushing the trailing end of each article in said train in said second direction as the train is being returned on said second conveyors to said main conveyor to urge said articles fully onto said main conveyor.

19. A method of conveying articles, comprising the steps of conveying a plurality of articles on a main conveyor, stopping a train of articles in end-to-end relation on said main conveyor, transferring said train of articles laterally in unison to a plurality of spaced parallel secondary conveyors disposed laterally of said main conveyor and overhanging opposed ends of each article beyond the corresponding sides of the respective secondary conveyor, operating said secondary conveyors in a first direction to move said train in said first direction, engaging said train with stop means to position the train at a given location spaced laterally from said main conveyor, stopping a second train of articles on said main conveyor, transferring said second train laterally to said secondary conveyors while operating said secondary conveyors to thereby move said second train laterally on said secondary conveyors into engagement with said first train, moving a plurality of parallel members upwardly within the spaces between adjacent secondary conveyors to simultaneously lift said trains from said secondary conveyors and elevate said trains to a storage location, lowering said members to a level beneath said secondary conveyors to redeposit said trains on said secondary conveyors, operating said secondary conveyors in a second direction toward said main conveyor to sequentially return each train to said main conveyor, and engaging the trailing end of each article in said train as it is being returned to said main conveyor and pushing said article in said second direction by means separate from said secondary conveyors to insure full return of said articles to said main conveyor.

20. A conveying system having a storage unit for storing articles, comprising a main conveyor to convey a plurality of articles, a plurality of spaced generally parallel secondary conveyors extending laterally from a side of said main conveyor, a storage assembly disposed adjacent said side of said main conveyor and including a supporting structure having a generally U-shaped horizontal section and having an open side facing said main conveyor, said storage assembly also including a lift unit disposed within the supporting structure and including a rear member and a pair of side members extending outwardly from said rear member toward said main conveyor, said lift unit also including a plurality of spaced generally parallel lifting members extending outwardly from said rear member toward said main conveyor, guide means for guiding the lift unit in vertical movement relative to said supporting structure, drive means for driving the lifting unit in a vertical direction with respect to said supporting structure, said lifting members disposed to move within spaces between adjacent secondary conveyors, transfer means for transferring a row of articles disposed in end-to-end relation on said main conveyor laterally onto said secondary conveyors, and second drive means for operating said secondary conveyors in unison to move said row of articles laterally of said first conveyor, said articles having a greater width than the width of the secondary conveyors so that opposed ends of said articles overhang the corresponding sides of the secondary conveyors, upward vertical movement of said lifting members within said spaces engaging the overhanging ends of the articles to lift the articles upwardly from the secondary conveyors to a storage location, said lifting members being constructed and arranged to prevent lateral movement between each of said articles in said row as said articles are lifted upwardly.

* * * * *